US011494359B2

(12) United States Patent
Hao et al.

(10) Patent No.: US 11,494,359 B2
(45) Date of Patent: Nov. 8, 2022

(54) INDEX AND STORAGE MANAGEMENT FOR MULTI-TIERED DATABASES

(71) Applicant: SAP SE, Walldorf (DE)

(72) Inventors: Zhilong Hao, Xi'an (CN); Priya Sharma, Pune (IN); Yinghua Ouyang, Xi'an (CN)

(73) Assignee: SAP SE, Walldorf (DE)

( * ) Notice: Subject to any disclaimer, the term of this patent is extended or adjusted under 35 U.S.C. 154(b) by 427 days.

(21) Appl. No.: 16/356,240

(22) Filed: Mar. 18, 2019

(65) Prior Publication Data
US 2020/0301901 A1    Sep. 24, 2020

(51) Int. Cl.
*G06F 17/00* (2019.01)
*G06F 7/00* (2006.01)
*G06F 16/22* (2019.01)
*G06F 16/2455* (2019.01)
*G06F 12/0804* (2016.01)

(52) U.S. Cl.
CPC ...... *G06F 16/2264* (2019.01); *G06F 12/0804* (2013.01); *G06F 16/2455* (2019.01); *G06F 2212/1032* (2013.01)

(58) Field of Classification Search
CPC ............. G06F 16/2264; G06F 16/2455; G06F 12/0804; G06F 2212/1032
USPC ......................................................... 707/741
See application file for complete search history.

(56) References Cited

U.S. PATENT DOCUMENTS

| | | | | |
|---|---|---|---|---|
| 5,960,194 A * | 9/1999 | Choy | ...................... | G06F 9/355 707/999.102 |
| 7,398,271 B1 * | 7/2008 | Borkovsky | ........... | G06F 16/951 709/219 |
| 10,481,820 B1 * | 11/2019 | Dunbar | ................. | G06F 3/0647 |
| 2008/0010238 A1 * | 1/2008 | Whyte | .................. | G06F 16/316 707/E17.085 |
| 2008/0033909 A1 * | 2/2008 | Hornkvist et al. | ...... | G06F 16/31 707/E17.069 |
| 2009/0171867 A1 * | 7/2009 | Bilenko | ................ | G06F 16/951 707/999.1 |
| 2012/0215752 A1 * | 8/2012 | Parkkinen | ............... | G06F 16/22 707/705 |
| 2015/0379056 A1 * | 12/2015 | Bolik | .................. | G06F 16/1744 707/693 |

* cited by examiner

*Primary Examiner* — Pavan Mamillapalli
(74) *Attorney, Agent, or Firm* — Sterne, Kessler, Goldstein & Fox P.L.L.C.

(57) ABSTRACT

Disclosed herein are system, method, and computer program product embodiments for providing index and storage management for multi-tiered databases. An embodiment operates by receiving a request to create an index on a multi-tiered database including both an in-memory store and a disk store. A multi-store table associated with the index is determined, wherein the multi-store table includes both a first set of data stored on the memory store and a second set of data stored on the disk store. Either the first set of data or the second set of data on which to create the index is selected based on the request. The index for the selected set of data of the multi-store table is generated. The index is stored on either the disk store or the memory store as corresponding to the selected set of data for which the index was generated.

17 Claims, 4 Drawing Sheets

INDEX AND STORAGE MANAGEMENT FOR MULTI-TIERED DATABASES

BACKGROUND

Some databases enable storage on multiple tiers, such as on both disk and memory. Creating an index on a multi-tiered database with both memory and disk storage accessible, often includes creating two indexes, one for each storage location. However, creating, storing, and maintaining multiple indexes requires both additional memory and processing power which can drain system resources and reduce overall system throughput.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing index and storage management for multi-tiered databases.

Figure 1:
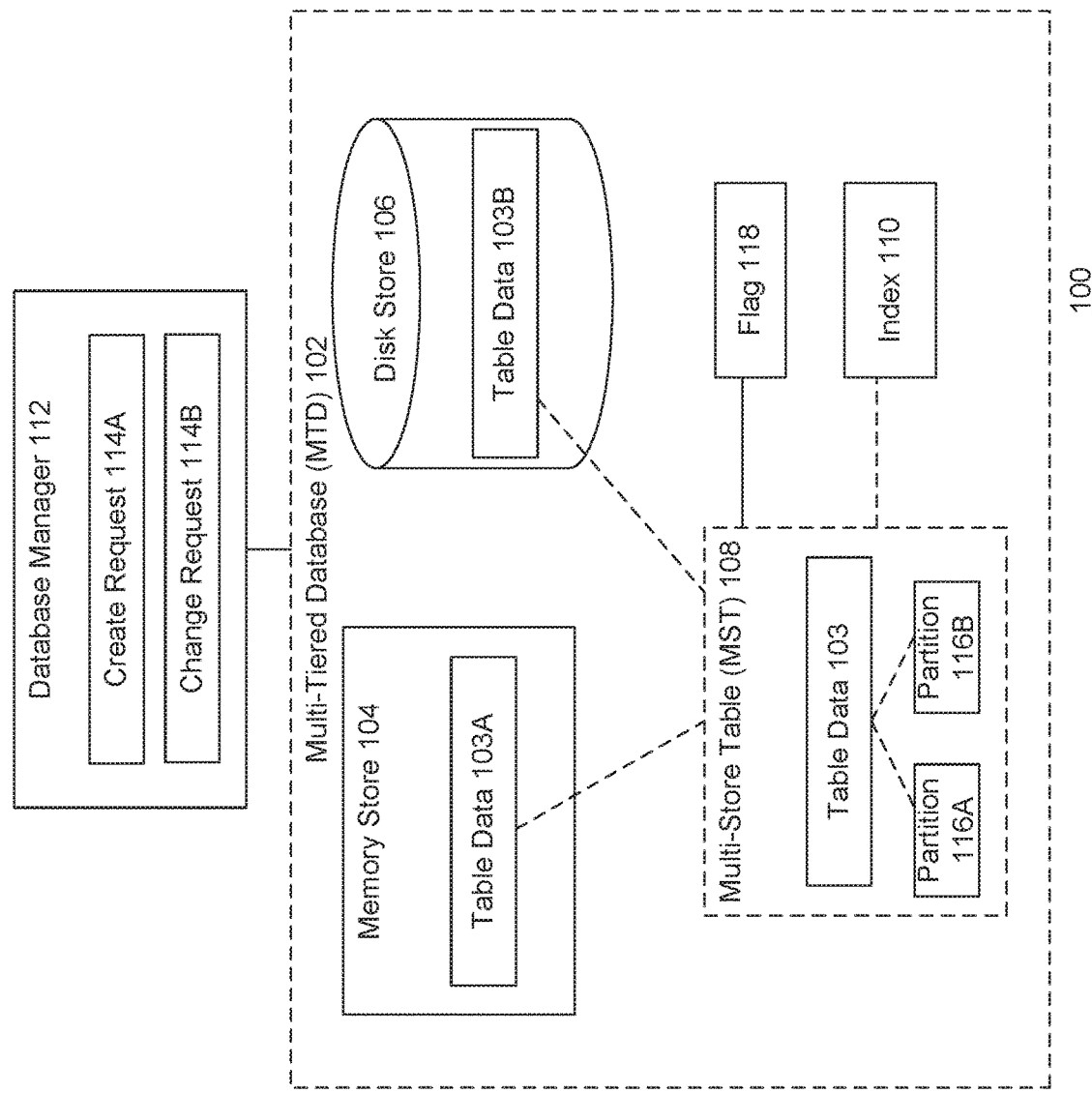
FIG. 1 is a block diagram illustrating example functionality for providing index and storage management for multi-tiered databases, according to some embodiments.

FIG. 1 is a block diagram 100 illustrating example functionality for providing an index and storage management system for multi-tiered databases, according to some embodiments.

A multi-tiered database (MTD) 102 may include table data 103 stored in both a memory store 104 and a disk store 106. In an embodiment, the memory store 103 may be used to store 'hot' or frequently accessed data, while the disk store 106 may be used to store 'warm' or 'cold' data (which may be less frequently accessed). However, MTD 102 may transfer data 103 between memory store 104 and disk store 106 based on changing system requirements, workloads, circumstances, or user requests.

In an embodiment, memory store 104 may include an in-memory database configured to store a portion of table data 103 (i.e., table data 103A). Similarly, disk store 106 may include a disk-based database configured to store another portion of the table data 103 (i.e., table data 103B). Data 103A (in memory store 104) may be 'hot' data that requires or is anticipated to require faster access for reads, writes, or updates, relative to table data 103B stored in disk store 106.

MTD 102 may store millions or billions of records, which may be too many to store all of them in memory store 104 because memory storage may be expensive relative to disk storage. And since all of the data of MTD 102 may be accessed with equal frequency equally, the more frequently (or more recently) accessed data may be stored in memory store 104. As such, less frequently accessed data 103B may be stored in disk store 106. Table data 103A may include different records than table data 103B. However, during the course of operations, MTD 102 may shift and transfer data (e.g., records) between memory store 104 and disk store 106 to optimize or maximize performance.

MTD 102 may include one or more tables with data stored in memory store 104, disk store 106, or both. A multi-store table (MST) 108 is an example of a table of MTD 102 in which table data 103 is stored across both memory store 104 and disk store 106. While table data 103 may be systematically stored across different storage devices (104, 106), a single query may be executed against MST 108 similar to how a query would be executed against a table with all the data stored in either memory or on disk storage. From an end user perspective, all of the table data 103A and 103B would appear in a single table as a collaborative set of table data 103. In an embodiment, a user may not know which data 103 is stored on memory store 104 and disk store 106.

In an embodiment, to improve the speed of data retrieval operations on a database table, such as MST 108, MTD 102 may create an index 110 for table data 103. Index 110 may be used to quickly locate data (e.g., in response to queries) without having to search every row in a database table from both memory store 104 and disk store 106 every time a database table is accessed. An index 110 may be created by identifying one or more columns of a database table (e.g., DST 108) which may be copied and then can be used to search the data very efficiently (relative to searching the underlying data of the table or DST 108).

Normally, an index is created on all of the table data 103, such that all of the rows are accounted for in the index. In the case of a multi-store table, that would mean creating two indexes, one for the memory store 104 portion including table data 103A, and one for the disk store 106 portion including table data 103B. However, creating two indexes requires more processing power in creating the indexes, more storage space in storing the indexes, and even more processing power in maintaining the indexes—especially in those situations when not both indexes are necessary.

As such, database manager 112 provides the ability to create an index on an identified store 104, 106 or other portion of the table data 103 of an MST 108. For example, database manager 112 may enable a user to select whether to build index 110 on table data 103A from memory store 104, table data 103B on disk store 106, or both. Rather than automatically building an index 110 on table data 103 from both memory store 104 and disk store 106 on table data 103B, database manager 112 may enable a user to select on which portion of table data 103 to build the index 110, thus reducing the processing and memory resources required to build and maintain an index 110.

As referenced above, in an embodiment, a user or particular system may not require or want an index 110 to be created on both table data 103A and table data 103B. For example, 80% of queries on table data 103 may be received on table data 103A, so building and maintaining an additional index 110 on table data 103B may be not be worth the cost. Creating and maintaining an extra index could consume double (and sometimes more than double) the processing and storage resources compared to only creating and maintaining one index.

For example, the majority of the data of a particular MST 108 may be stored in disk store 106. For example, table data 103A may include one million records, while table data 103B may include one billion records. If a user only requires an index 110 on table data 103A of memory store 104, then creating a second index 110 on table data 103B would be a waste of resources and storage space—especially if most queries are directed to table data 103A. Similarly, if a user only requires an index 110 on table data 103B, then creating an index 110 on table data 103A would unnecessarily consume additional processing resources and valuable memory space.

Thus, rather than building an index 110 in both memory store 104 for table data 103A and disk store 106 for table data 103B, database manager 112 may enable a user to select on which portion of table data 103 the index 110 is to be built and maintained. As such, database manager 112 enables a system, such as an MTD 102, to save processing resources and memory space.

In an embodiment, database manager 112 may receive a create request 114A to create an index 110. Create request 114A may indicate from which column(s) on which table(s) of MTD 102 an index 110 is to be created. The tables may include both multi-store tables (MST 108) and/or tables in which all the data is either stored on disk store 106 or memory store 104. For an MST 108, which has data stored in both memory store 104 and disk store 106, create request 114A may include an indication as to on which data 103A, 103B or which store 104, 106 to build the index 110. Database manager 112 or MTD 102 may then build index 110 from the indicated stores 104, 106 or portion(s) of data 103.

In an embodiment, when an index is created a flag 118 may be set to indicate on which store 104, 106 or portion of table data 103 index 110 has been created or is being maintained. Flag 118 may be metadata, or another indicator such as a binary value that identifies on which portions of table data 103 indexes 110 have been built. Then, for example, when a create request 114A is received, MTD 102 may check flag 118 before creating a new index 110 to make sure no duplicate indexes are created. For example, if a user has previously requested that an index on col A of MTB 108 in memory store 104 is to be created, then flag 118 for MST 108 may indicate that index 110 for memory store 104 has been created. The flag 118 may also indicate on which columns the index 110 has been built. If a subsequent request to create an index 110 for memory store 104 or table data 103A for MST 108 is received, MTD 102 may determine from flag 118 that an index 110 already exists and may preserve resources by denying the create request 114A and not creating a duplicate index 110.

If a subsequent or second create request 114A is received to create an index 110 on disk store 106, MTD 102 may create a second index 110 on the requested store 106, which may result in full index being maintained for both stores 104, 106 of MST 108. In an embodiment, a create request 114A without an indicator (as to on which store 104, 106) to create an index 110, may be interpreted as creating an index 110 on the unflagged 118 store if one of the stores has been flagged 118 as including an index. In another embodiment, the create request 114A may be ignored, or a user may be asked for clarification as to which on which store 104, 106 to create index 110.

In an embodiment, database manager 112 may receive a change request 114B. Change request 114B may be used to modify or delete an existing index 110. Modifying an index 110 may include changing (adding, removing, modifying) the columns and/or tables from which data is copied to populate the index. For example, a modify request may change index 110 from col. 1 on MST 108 to col. 2 of MST 108. A modify request may also include changing the name of an index 110.

A delete request may delete, drop, remove, or mark for garbage collection a previously created index 110. In an embodiment, if an index 110 has been created for both stores 104, 106 of MST 108, a delete request may convert the full index into a partial index. For example, a user may request 114B that only the index 110 on disk store 106 is deleted, while the index 110 on memory store 104 is maintained. MTD 102 may then delete the index 110 from disk store 106 and update flag 118 to indicate that there is only an index 110 on memory store 104. MTD 108 may continue maintaining the index 110 on memory store 104. A user may later use a create request 114A to re-create the dropped or deleted index 110 as described above.

Example syntax for creating and changing partitions using requests 114 is provided below.

To create a full index on both stores 104, 106 from col 1 of table 1, database manager 112 may generate or receive a command such as:

| | | | |
|---|---|---|---|
| CREATE INDEX | index_1 | ON | T1 (c1) |

To create a partial index 110 on memory store 104 (hot storage), the syntax may be:

| | | | |
|---|---|---|---|
| CREATE INDEX | index_1 | ON | T1 (c1) FOR HOT STORAGE |

To create a partial index 110 on dis store 106 (warm storage), the syntax may be:

| | | | |
|---|---|---|---|
| CREATE INDEX | index_1 | ON | T1 (c1) FOR WARM STORAGE |

To convert a partial index 110 on disk store 106 to a regular or full index, and create an index on memory store 104, the syntax may be:

| | | |
|---|---|---|
| ALTER INDEX | index_1 | CREATE FOR HOT STORAGE |

To convert a partial index 110 on memory store 104 to a regular or full index, and create an index on dis store 106, the syntax may be:

| | | |
|---|---|---|
| ALTER INDEX | index_1 | CREATE FOR WARM STORAGE |

To convert a full index into a partial index 110 by deleting or dropping the index on the memory store 104, the syntax may be:

| | | |
|---|---|---|
| ALTER INDEX | index_1 | DROP FOR HOT STORAGE |

To convert a full index into a partial index 110 by deleting or dropping the index on the disk store 106, the syntax may be:

| | | |
|---|---|---|
| ALTER INDEX | index_1 | DROP FOR WARM STORAGE |

In another embodiment, a user may create multiple indexes 110 on the same store 104, 106 or portion of table data 103A, 103B—as long as the indexes 110 are not duplicates. For example, memory store 104 may include both a first index on cols A and B, a second index on cols C and D, and a third index on cols A and D.

In an embodiment, table data 103 may be partitioned into two or more partitions 116. The partitions 116 may divide the table data 103 into several different groups of data based on a set of one or more parameters. The partitions 116 may indicate ranges of values from one or more columns of multi-store table 108 that are used to determine how to divide or group table data 103. For example, partition 116A may include those records with an account value <=$500, while partition 116B includes those records from table data 103 with account value >$500. Then, for example, MTD 102 or a user may decide where each partition 116A, 116B is stored (e.g., on memory store 104, or disk store 106). In an embodiment, MTD 102 may dynamically shift partitions 116 from memory store 104 to disk store 106, or vice versa, based on a query history or data access or usage history.

When receiving a create request 114A or change request 114B, a user may identify a particular partition 116 on which to create an index 110 or change an index 110. For example, when create request 114A indicates one or more partitions 116 of table data 103 on which to create index 110, MTD 102 may determine from flag 118 whether the partition 116 is stored on memory store 104 or disk store 106. MTD 102 may similarly check flag 118 upon receiving change requests 114B on one or more partitions 116. In an embodiment, create request 114A may include an indication of a partition 116 on both memory store 104 and data store 106, but may also exclude one or more other partitions 116 that are stored on either memory store 104 or disk store 106.

Figure 2:
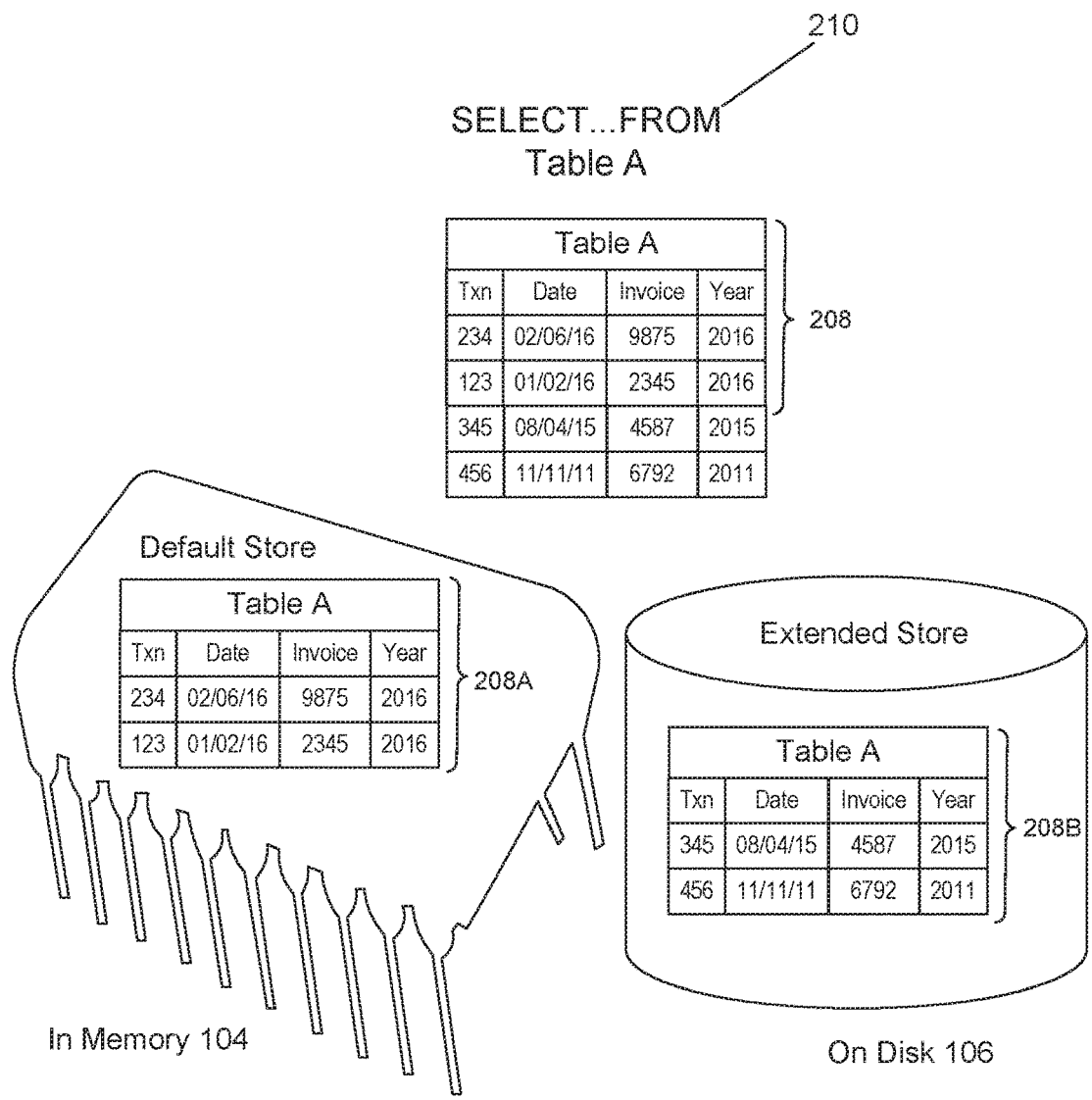
FIG. 2 is a block diagram illustrating an example multi-tiered database, according to some embodiments.

FIG. 2 is a block diagram illustrating an example multi-tiered database (MTD) 202, according to some embodiments. In the example of FIG. 2, a table 208 (an example MST 108) is illustrated that may exist in MTD 202. As illustrated, a portion 208A of the records of table 208 are stored in default or hot storage in memory 104, and a portion 208B of the records are stored in extended store on disk 106. When a query 210 is generated by database manager 112 or received by MTD 202, the query 210 may be executed against table 208.

The query 210 may be executed against table 208, which may include querying both table 208A and table 208B. If memory 104 or disk 106 include any indexes 110 that are relevant to query 210, then the indexes may be used to process the query 210 and return a result—which may include rows or records from either or both memory 104 and disk 106.

Figure 3:
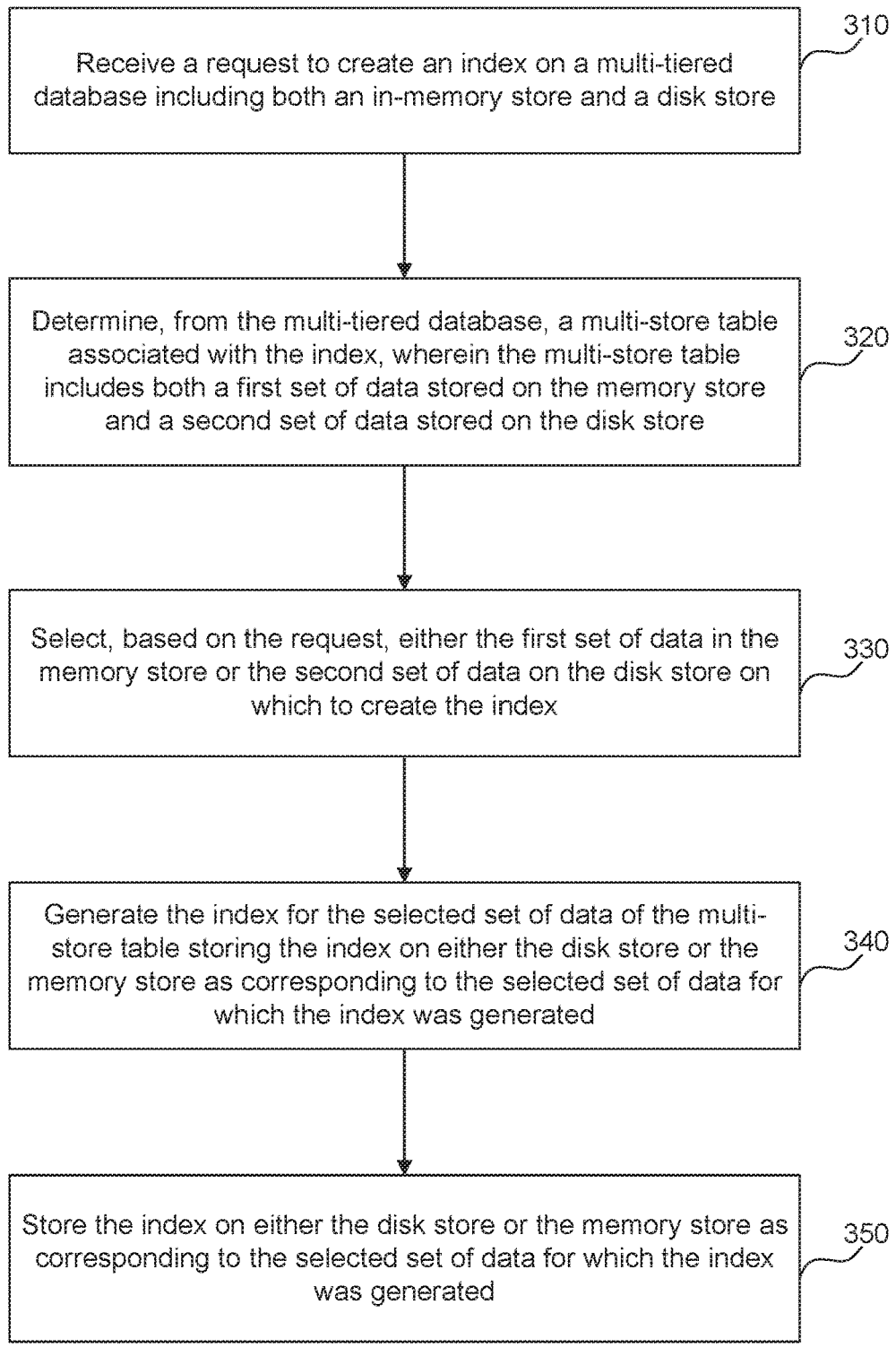
FIG. 3 is a flowchart illustrating example operations of a system for providing index and storage management for multi-tiered databases, according to some embodiments.

FIG. 3 is a flowchart 300 illustrating example operations of operations of a system for providing index and storage management for multi-tiered databases, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, a request to create an index on a multi-tiered database including both an in-memory store and a disk store is received. For example, MTD 102 may receive create request 114A to create an index 110 on one of memory store 104 or disk store 106.

In 320, a multi-store table associated with the index is determined, wherein the multi-store table includes both a first set of data stored on the memory store and a second set of data stored on the disk store. For example, one or more MSTs 108 may be identified as being relevant to a received query 210. MST 108 may include table data 103 stored on both memory store 104 and disk store 106.

In 330, either the first set of data in the memory store or the second set of data on the disk store on which to create the index is selected based on the request. For example, MTD 102 may identify from create request 114A whether to create index 110 on table data 103A from memory store 104 or table data 103B on disk store 106, or both.

In 340, the index for the selected set of data of the multi-store table is generated. For example, MTD 102 may generate index 110 on the identified store 104, 106. MTD 102 may also update flag 118 to indicate which index 110 has been created.

In 350, the index is stored on either the disk store or the memory store as corresponding to the selected set of data for which the index was generated. For example, if index 110 is created on table data 103A of memory store 104, then index 110 may be stored on memory store 104. Similarly, if index 110 is created on table data 103B of disk store 106, then index 110 may be stored on disk store 106. When a query 210 is received on MST 208, any relevant index 110 (on either memory store 104 or disk store 106) may be used to process the query 210 and return a result (e.g., one or more records satisfying the query).

Figure 4:
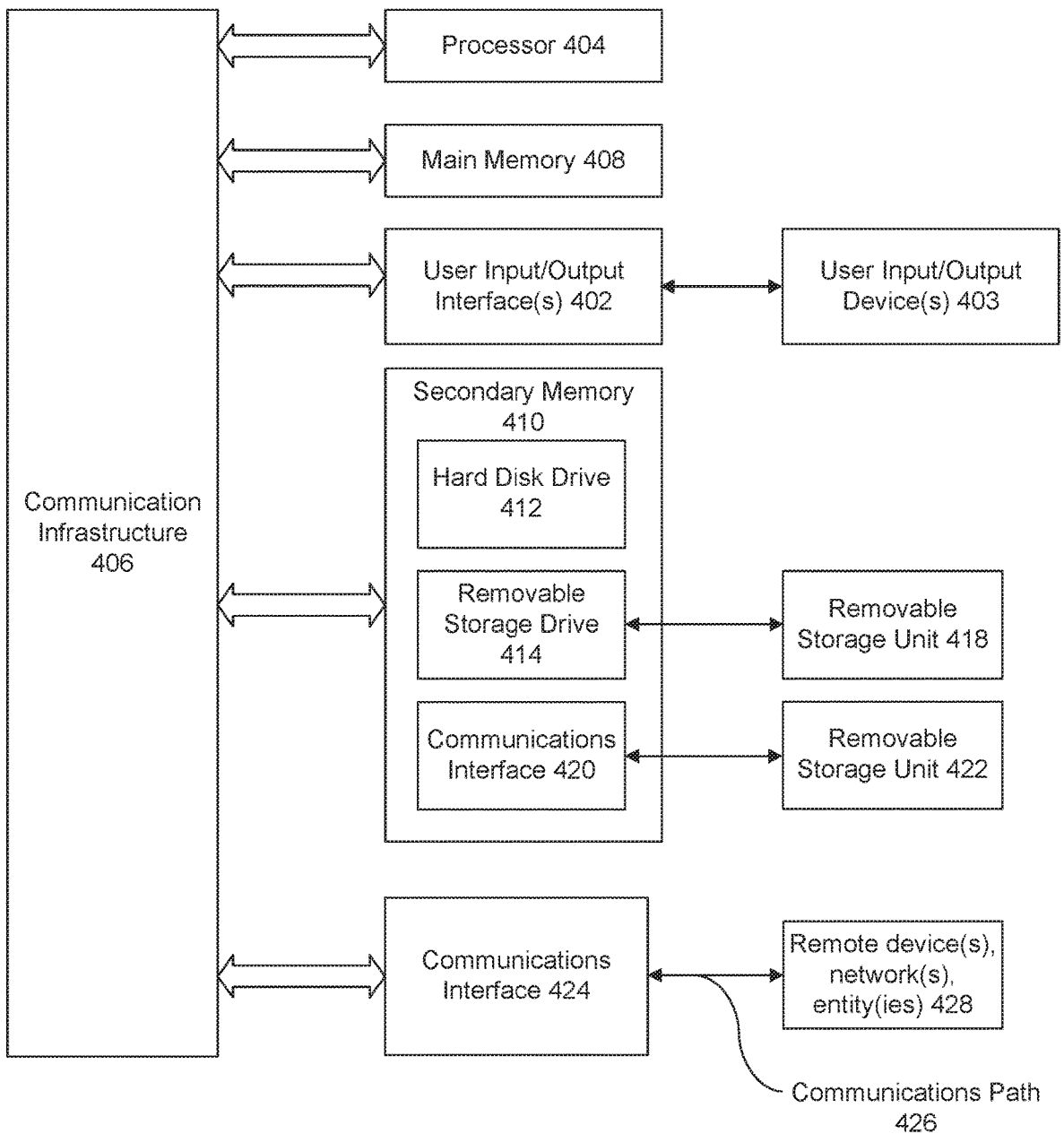
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/or any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
  receiving a user selection of one of an in-memory store or a disk store on which to create an index for a multi-store table of a multi-tiered database, wherein the user selection is based on whether the in-memory store or the disk store includes a greater number of queries, wherein the multi-store table includes both a first set of data stored on the memory store and a second set of data stored on the disk store;
  selecting, based on the request, either the first set of data in the memory store or the second set of data on the disk store on which to create the index;
  generating the index for the selected set of data of the multi-store table; and
  storing the index on either the disk store or the memory store as corresponding to the selected set of data for which the index was generated.

2. The method of claim 1, wherein the memory store includes an in-memory database structure configured to store the first set of data.

3. The method of claim 2, wherein the disk store includes a disk database structure configured to store the second set of data of the multi-store table.

4. The method of claim 1, wherein the storing the index comprises:
  updating a metadata flag to indicate on which set of data the index for the multi-store table was generated.

5. The method of claim 4, further comprising:
  receiving a query on the multi-store table; and
  processing the query using the stored index.

6. The method of claim 1, further comprising:
  receiving a second request to generate a second index for an unselected set of data of multi-store table different from the selected set of data;
  generating the second index for the unselected set of data;
  storing the second index on either the memory store or the disk store as corresponding to a storage location of the unselected set of data, wherein both the memory store and the disk store include at least one index for the multi-store table.

7. The method of claim 1, further comprising:
  determining that the request indicates a selection of both the in-memory store and the disk store on which to create the index.

8. The method of claim 1, wherein the user selection is based on which one of the in-memory store or a disk store includes a majority of data of the table.

9. A system comprising:
  a memory; and
  at least one processor coupled to the memory and configured to:
    receiving a user selection of one of an in-memory store or a disk store on which to create an index for a multi-store table of a multi-tiered database, wherein the user selection is based on whether the in-memory store or the disk store includes a greater number of queries, wherein the multi-store table includes both a first set of data stored on the memory store and a second set of data stored on the disk store;
    select, based on the request, either the first set of data in the memory store or the second set of data. on the disk store on which to create the index:
    generate the index for the selected set of data of the multi-store table; and
    store the index on either the disk store or the memory store as corresponding to the selected set of data for which the index was generated.

10. The system of claim 9, wherein the memory store includes an in-memory database structure configured to store the first set of data.

11. The system of claim 10, wherein the disk store includes a disk database structure configured to store the second set of data of the multi-store table.

12. The system of claim 9, wherein the at least one processor that stores the index is further configured to:
  update a metadata flag to indicate on which set of data the index for the multi-store table was generated.

13. The system of claim 12, wherein the at least one processor is further configured to:
  receive a query on the multi-store table; and
  process the query using the stored index.

14. The system of claim 9, wherein the at least one processor is further configured to:
  receive a second request to generate a second index for an unselected set of data of multi-store table different from the selected set of data;
  generate the second index for the unselected set of data;
  store the second index on either the memory store or the disk store as corresponding to a storage location of the unselected set of data, wherein both the memory store and the disk store include at least one index for the multi-store table.

15. A non-transitory computer-readable device having instructions stored thereon that, when executed by at least one computing device, cause the at least one computing device to perform operations comprising:
  receiving a user selection of one of an in-memory store or a disk store on which to create an index for a multi-store table of a multi-tiered database, wherein the user selection is based on whether the in-memory store or the disk store includes a greater number of queries, wherein the multi-store table includes both a first set of data stored on the memory store and a second set of data stored on the disk store;
  selecting, based on the request, either the first set of data in the memory store or the second set of data on the disk store on which to create the index;
  generating the index for the selected set of data of the multi-store table; and
  storing the index on either the disk store or the memory store as corresponding to the selected set of data for which the index was generated.

16. The device of claim 15, wherein the memory store includes an in-memory database structure configured to store the first set of data.

17. The device of claim 16, wherein the disk store includes a disk database structure configured to store the second set of data of the multi-store table.

* * * * *